US008944658B1

(12) United States Patent
Madhav et al.

(10) Patent No.: US 8,944,658 B1
(45) Date of Patent: Feb. 3, 2015

(54) LED HOLDER FOR LIGHTING PANELS

(75) Inventors: Jagdish T. Madhav, Bothell, WA (US); Mark L Cloud, Seattle, WA (US)

(73) Assignee: The Boeing Company, Chicago, IL (US)

( * ) Notice: Subject to any disclaimer, the term of this patent is extended or adjusted under 35 U.S.C. 154(b) by 342 days.

(21) Appl. No.: 12/558,369

(22) Filed: Sep. 11, 2009

(51) Int. Cl.
*A41F 1/00* (2006.01)
*F21V 8/00* (2006.01)

(52) U.S. Cl.
CPC .................................. *G02B 6/0006* (2013.01)
USPC ........... 362/581; 362/555; 362/576; 362/649; 362/650; 362/651; 362/652; 362/653; 362/654; 362/655; 362/656; 362/249.02; 362/249.06; 385/88; 385/92

(58) Field of Classification Search
USPC ......... 362/555, 576, 581, 647, 649, 650, 651, 362/652, 653, 654, 655, 656, 249.02, 362/249.06; 385/88, 92
See application file for complete search history.

(56) References Cited

U.S. PATENT DOCUMENTS

| | | | | |
|---|---|---|---|---|
| 2,035,998 | A * | 3/1936 | Thompson | 340/815.43 |
| 3,611,360 | A * | 10/1971 | Bailey | 340/815.51 |
| 5,048,921 | A * | 9/1991 | Jones et al. | 385/69 |
| 5,232,249 | A * | 8/1993 | Kolvereid | 285/39 |
| 5,440,658 | A * | 8/1995 | Savage, Jr. | 385/79 |
| 5,486,984 | A * | 1/1996 | Miller | 362/560 |
| 5,548,676 | A * | 8/1996 | Savage, Jr. | 385/92 |
| 5,732,176 | A * | 3/1998 | Savage, Jr. | 385/92 |
| 5,772,380 | A | 6/1998 | Cloud et al. | 411/508 |
| 5,988,842 | A * | 11/1999 | Johnsen et al. | 362/551 |
| 6,092,318 | A * | 7/2000 | Arie et al. | 40/547 |
| 6,302,595 | B1 * | 10/2001 | Vilgiate et al. | 385/88 |
| 6,337,946 | B1 * | 1/2002 | McGaffigan | 385/146 |
| 6,623,152 | B1 * | 9/2003 | Kroening | 362/555 |
| 7,186,012 | B2 * | 3/2007 | Schevardo et al. | 362/555 |
| 7,591,574 | B2 * | 9/2009 | Eschbach | 362/555 |
| 7,793,423 | B2 * | 9/2010 | Loftis et al. | 33/286 |
| 7,976,204 | B2 * | 7/2011 | Li et al. | 362/555 |
| 2003/0213801 | A1 * | 11/2003 | Bradley et al. | 220/3.8 |
| 2005/0007791 | A1 * | 1/2005 | Helbach et al. | 362/555 |
| 2008/0285278 | A1 * | 11/2008 | Bole | 362/249 |
| 2009/0033921 | A1 * | 2/2009 | Loftis et al. | 356/138 |

FOREIGN PATENT DOCUMENTS

GB    2261061 A  *  5/1993

OTHER PUBLICATIONS

Diehl Aerospace Website; "Interior Lighting", 2 pgs., http://www.diehl-aerospace.de/index.php?id=1345&L=1.

* cited by examiner

*Primary Examiner* — Jong-Suk (James) Lee
*Assistant Examiner* — Tsion Tumebo
(74) *Attorney, Agent, or Firm* — Toler Law Group, PC

(57) ABSTRACT

A panel illumination light source positioning and holding mechanism and method of operation and installation is disclosed for a light panel comprising a panel having on a front side thereof a front film forming an illumination surface, and an insertion hole through the panel to the film, the positioning and holding mechanism may comprise a hollow insertion portion extending into the insertion hole, the hollow insertion portion receiving an LED assembly; a locking mechanism locking the insertion portion in place after insertion into the insertion hole; a light pipe reception and holding mechanism, with a light pipe inserted into the light pipe reception and holding mechanism. The positioning and holding mechanism may also comprise a parallel extending portion holding the LED.

20 Claims, 5 Drawing Sheets

LED HOLDER FOR LIGHTING PANELS

FIELD

The present disclosure relates to interior lighting, such as may be utilized on the interior surfaces of a vehicle, such as an aircraft and methods of installing same.

BACKGROUND

The present disclosure matter relates, generally, to panel illumination for interior paneling such as in vehicles, such as airplanes or automobiles and trucks. Various panel illumination designs providing either diffused soft lighting or decorative patterns of light, or both, are known in the art for use in these applications and others. As an example, as illustrated on the website of Diehl aerospace in Germany, http://www.diehl-aerospace.de/index.php?id=1345&L=1, exemplary aircraft cabin lighting can be used to avoid lighting glare, illuminate instruments and signs, and provide decorative patterns of light.

Light Emitting Diodes (LEDs), replacing fluorescent tubes, are paving the way for a completely new trend in vehicle interior lighting, such as aircraft cabin lighting, enabling new perspectives in cabin design and the potential to reduce significantly maintenance efforts and costs such as light source (incandescent and fluorescent) replacements.

FIG. 1 shows an example of a panel lighting arrangement 20 utilizing an LED holder 30 currently in use made of a suitable plastic material such as Acrylic Butadiene Styrene (ABS). The LED holder 30 extends into an opening in a lighting panel 22, which panel 22 may be made from a suitable light weight but sturdy plastic, such as an extruded polystyrene foam, and, for minimization of weight while retaining strength and structural integrity, may be formed in a honeycomb pattern, regular or irregular, with a portion of the panel 22 shown in FIG. 1 being a solid region of the honeycomb pattern. The panel 22 is sandwiched between a thin front film or skin 24 with a decorative surface, on the side viewed by the passenger when in use. The film 24 may be made of a polyvinyl chloride or the like. The panel 22 has a back film layer 26 on the side opposite from the viewed side, which can be made from a suitable plastic material, such as nylon, to give the panel overall strength and toughness, while retaining some flexibility without allowing the honeycombed foam material to crack or split.

Throughout this specification, for consistency and without limitation, these two sides of the lighting panel, as well as the orientation of elements of the LED holders will be referenced as the front (viewed) and back (reverse hidden) sides.

An individual LED light string 28 is held in a bushing 30, which bushing 30 may be inserted into the opening in the panel 22. The bushing 30 has an expanded cylindrical back portion 32, which may be ribbed to act as an insertion knob. The bushing 30 has a smaller diameter front portion 34 with a front end 36, having a front end opening 38. The interior of the bushing 30 back portion 32 and front portion 34 may be hollow and threaded with internal threads 44. A light pipe 40, in the shape of cylinder with a front end tapering to a light pipe rod, has external threading on the cylindrical portion engaging the interior threads in the bushing 30. The rod portion of the light pipe 40, which has a special light shaping surface terminal end portion 52, extends through the opening 38 in the bushing front portion 34 front end 36. The cylindrical portion of the light pipe 40 is also hollow and in turn receives the LED 50 at the end of LED string 28 containing suitable wiring and connectors to power the LED, select color for the LED and the like.

There are a number of problems with existing panel illumination systems, which include problems with establishing and maintaining proper positioning and alignment during installation, maintenance of positioning of the LED's 50 and/or light pipes 40 after installation, due to, e.g., vibration experienced in vehicular lighting applications, and problems in limited space available on the rear side of the panel, such as panels placed in positions in close proximity to a bulkhead or gauge housing wall or the like on the rear side of the panel 22.

Alignment and positioning of the LED 50 and light pipe 40 vis-á-vis the panel 22 is critical to the effectiveness and/or decorative and aesthetic effects of the lighting. Perhaps even more critical, especially to applications such as aircraft lighting, is the positioning of the terminal end 52 vis-á-vis the decorative front surface of the film 24 and alignment of the light pipe to the light source. As an example, alignment and positioning of the LED with respect to the light pipe can affect the amount of light emitting from the terminal end 52 of the light pipe 40. Positioning and alignment of the terminal end 52 of the light pipe 40 vis-á-vis the decorative film 24 decorative front surface can be critical to achieving the desired aesthetic effects and doing so consistently from panel to panel and vehicle to vehicle.

Installation requirements utilizing glue to fix the holder bushing 32 in the panel and allowing it to set prior to inserting the LED 50 and/or light pipe 40 are undesirable from a time aspect, a materials aspect, a cost aspect and a health aspect.

A requirement to remove burrs or chads, left from drilling a hole for a light pipe 40 extension 52 opening in the front decorative film 24, also is objectionable from a time standpoint, and if not done properly can result in partly or completely blocking the light exiting the light pipe 40 at the decorative side of the film 24.

Current assembly and installation practice also requires drilling holes in the panel 22 from the rear side at appropriate LED 50 location points in the panel 22 for a desired distribution and pattern of the LEDs. The prior art bushings 30 are then glued in place and after setting hollowed out from the rear side by drilling. Then a hole is drilled from the front side for the light pipe 40 to extend through, with this hole being hand cleaned followed by threaded insertion of the light pipe 40 and positioning of the light pipe terminal end 52. The light pipe 40 hole in the decorative film 24 and the holder bushing 30 must be in very tight registration. Such an installation process is rife with opportunities for misalignment and mispositioning and hence labor intensive.

This present installation process is done due to an acquired experience of the installer, perhaps supplemented by touch with the installer on the back side of the panel reaching around to the front side. Such potentially hit and miss alignment and positioning in the current process is not desirable.

An LED 50 is installed by pressing into the holder bushing 30 that in turn, is affixed by gluing, as shown in FIG. 1.

Many of these same problems also can be encountered in utilizing the current LED holder bushings 30 in other applications, e.g., where there is no light pipe utilized, such as for diffused indirect lighting through illumination of the entire panel 22 viewed surface on the front film 24, with a distribution of LEDs in the panel, or the illumination of a gauge or gauge border with an LED light source.

In addition, the arrangement of FIG. 1 may be unavailable in cases where there is limited space on the back side of the panel 22. In many cases, the space available is not sufficient for the LED sleeve 28 to fit between the panel 22 and adjacent bulkhead or such structure.

Accordingly, there is a need in the art for an improved panel illumination light source holder arrangement that may be more efficiently and cost-effectively installed and used.

SUMMARY

A panel illumination light source positioning and holding mechanism and method of installation is disclosed for a light panel comprising a panel having on a front side thereof a front film forming an illumination surface, and an insertion hole through the panel to the film, the positioning and holding mechanism may comprise a hollow insertion portion extending into the insertion hole, the hollow insertion portion receiving an LED assembly, a locking mechanism locking the insertion portion in place after inserting into the insertion hole, a light pipe reception and holding mechanism, and a light pipe inserted into the light pipe reception and holding mechanism.

The light pipe reception and holding mechanism may comprise a beveled opening aligned with a light pipe opening in the front film. The positioning and holding mechanism may comprise an insertion stopping flange. The mechanism may further comprise one of the several locking mechanisms, not using adhesives, such as the locking mechanism comprising a plurality of flexible fins flexing in a direction opposite to the direction of insertion of the positioning and holding mechanism into the insertion hole. The locking mechanism may comprise a flexibly expanding tub comprising a locking arm with a locking fin driven into the material of the panel upon insertion of the insertion portion into expanding tub positioned in the insertion hole. The locking mechanism may comprise an NPT threaded engagement of the insertion mechanism with the insertion hole. The locking mechanism may comprise an inclined fin entering the material of the panel upon rotation of the insertion mechanism.

The panel illumination light source positioning and holding mechanism may comprise a hollow insertion portion extending into the insertion opening, the hollow insertion portion receiving a light pipe, a locking mechanism locking the insertion portion in place after inserting into the insertion hole, and a transparent parallel extending LED receiving portion reflecting light into the light pipe using a mirror or by Total Internal Reflectance (TIR). The disclosure also provides a positioning and holding mechanism wherein the locking mechanism comprises an inclined fin for entering the material of the panel upon rotation of the insertion mechanism.

BRIEF DESCRIPTION OF THE DRAWINGS

The features, functions, and advantages that are disclosed can be achieved independently in various embodiments of the present disclosure or may be combined in yet other embodiments further details of which can be seen with reference to the following description and drawings, wherein like numerals depict like parts, and wherein.

DETAILED DESCRIPTION

According to aspects of embodiments of the present disclosure unique LED holder designs, including holder bushing designs for holding a panel illumination LED light and/or light pipe in place are disclosed which can avoid the need for gluing in the installation process, eliminate a problem of drilling burrs and chards from interfering with proper optical performance, provide improved alignment and positioning, and maintain consistent and controlled optical performance.

Figure 1:
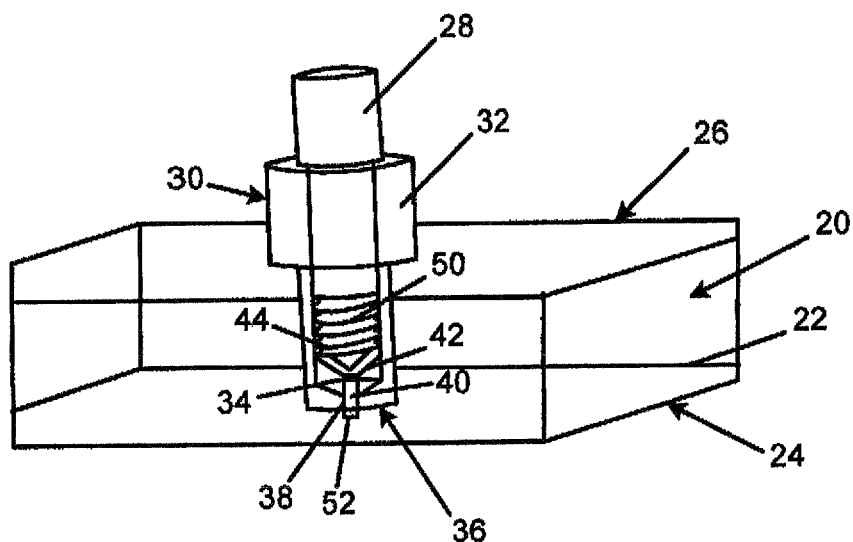
FIG. 1 shows a panel illumination LED holder of the type currently used on interior panels of aircraft.
Figure 2:
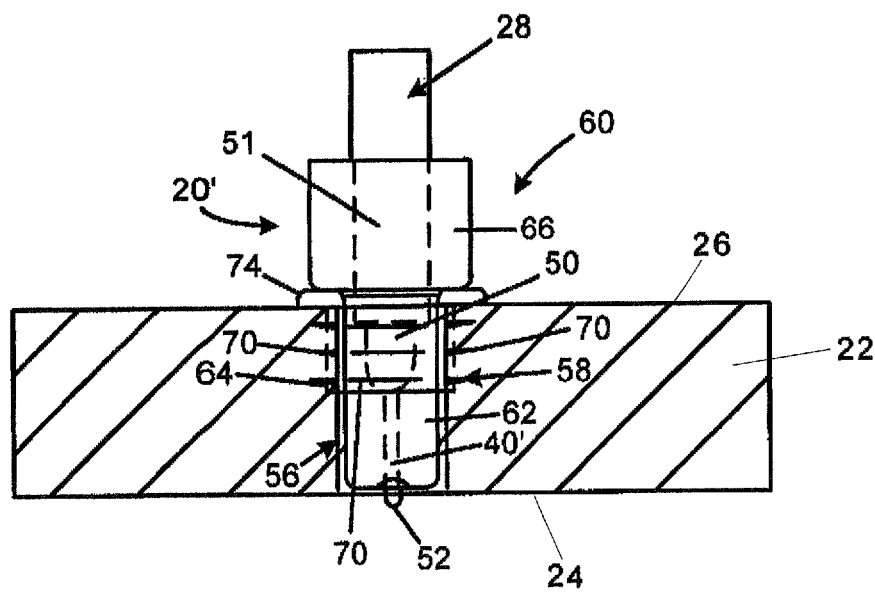
FIG. 2 shows illustratively a side view of an LED holder according to aspects of an embodiment of the present disclosure, inserted in a panel body shown in cross section, with interior components shown in phantom.
Figure 3:
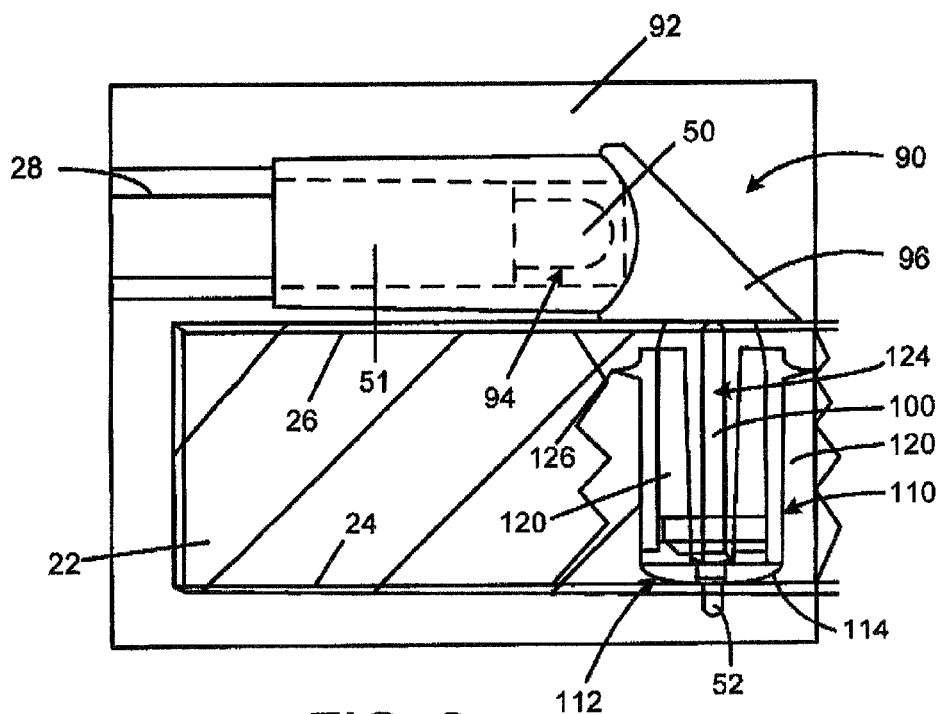
FIG. 3 shows partly schematically a side view of an LED holder according to aspects of an embodiment of the present disclosure inserted into a panel body shown in cross section, with internal elements shown in phantom.

Referring to FIGS. 2 and 3, there is provided an LED holder 60, which may be colored opaque with black or other colors, to avoid light emission other than through a light pipe 40'. Different color molded LED holder 60, can help provide color coding for different functionalities. The LED holder 60 is inserted into a holder reception opening, such as a cylindrical hole drilled in the panel 22, having a holder hole front region 56 and a holder hole back region 58. The LED holder 60 preferably is formed of a single piece of molded plastic, such as nylon, and includes a holder front end hollow cylindrical closed end tube 62 and a holder back end open ended cylindrical tube 64, and may also include a back end external open ended hollow cylindrical tube 66. A back end external positioning flange 68 preferably is formed intermediate the cylindrical tube 64 and the cylindrical tube 66.

Formed on the exterior of the cylindrical tube 64 are a plurality of sets of flexible nylon locking fins 70, which, as shown in more detail in FIG. 3, preferably are tapered to a knife edge 71, and shaped with a generally flat upper surface 71A and a slightly curved lower surface 71B to facilitate bending toward the external cylinder 66 when the LED holder 60 is inserted into the receptor hole back region 58 such that any effort to remove the holder 60 from the receptor hole will cause the fins 70 to penetrate the surrounding receptor hole back region 58 sidewalls, locking the LED holder 60 in place.

The flange 74 serves as a stop for the insertion of the holder 60 into its receptor hole opening in order to align and position the closed end of the LED holder front end cylindrical tube 62 closed end vis-a-vis the decorative film 24.

The closed end of the LED holder 60 front cylindrical tube 62 preferably is formed with a light pipe opening 38 having a reverse beveled edge 72 countersunk into the opening 38.

In operation, the LED holder 60 is inserted into the receptor hole in the panel 22 until the flange 74 abuts the rear film 26, with the fins 70 flexed into a position to prevent any reverse movement of the holder 60 back out of the hole in the panel 22. A light pipe hole in alignment with the light pipe opening 38 in the LED holder 60 may then be drilled in the decorative front film 24. A light pipe 40' is then be inserted into the drilled hole and through the opening 38. In this manner, in combination with the beveled edge 72 of the light pipe opening 38, any burrs or shards due to drilling the hole in the front film 24, especially due to drilling such a hole from the rear side of the panel 22, can be forced into the bevel 72 of the hollow end tube 62 and thus out of interference with the operation of the light pipe 40'. In addition to the alignment and positioning offered by insertion of the light pipe 40' through the insertion opening 38, due to the beveled portion 72, an insertion tool may be used to locate the correct extension of the terminal end 52 of the light pipe 40' from the opening 38 vis-á-vis the decorative front surface of the film 24.

As seen in FIG. 2, the light pipe 40' may be formed in a truncated tear drop shape, truncated at the rear end, and slightly bulging intermediate both ends. In this fashion, the insertion of the light pipe 40' through the beveled opening 38, in combination with the slight distortion of the beveled opening bevel 72 during the insertion, serves to "snap" the light pipe 40' in place after the widest portion of the light pipe 40' passes the pointed rim of the bevel 72. The diameter of the light pipe 40' and of the opening 38 at the pointed rim of the bevel 72, along with the positioning of the widest diameter of the light pipe 40' along its longitudinal extension, is chosen to selectively position the light pipe both with its terminal end 52 in proper position vis-á-vis the decorative front surface of the film 24 and with the rear end of the light pipe 40' correctly aligned to the LED 50 positioned within the interior of the holder 60.

An LED 50 mounted on the end of an LED string 28, with a wiring sleeve 51, may then be inserted into the LED holder 60 from the rear side of the holder 60. The external cylinder 60 of the holder, as an alternative to being open ended, is formed with an interior longitudinal cylindrical opening to receive the wiring sleeve 51 or with a rear terminal closed end having an opening to receive the wiring sleeve 51, thus aligning the wiring sleeve 51 and its attached LED 50 within the holder 60 and thus also with the light pipe 40'.

Turning now to FIGS. 3, 4, 5A and 5B, according to aspects of other embodiments of the disclosure, there is shown a parallel extending LED holder 90, 90', 90". Parallel, as used in the present disclosure means that the LED 50 and its associated string 28 and wiring sleeve 51 extend generally parallel to the front film 24 and rear film 26 surfaces, as opposed to extending vertically, i.e., generally normal to these surfaces in the embodiment of FIGS. 2 and 2A. This is also generally parallel to such surfaces 24, 26 at least in a direction from left to right in the illustrations of FIGS. 3, 4 and 5A and 5B. This does not require that the parallel extending portion 92 of the LED holder 90 or any part of it be exactly parallel to the front surface 24 of the panel 22 and/or the back surface 26 of the panel 22.

The degree to which the parallel extending portion 92 of the LED holder 90 is parallel with the front surface 24 and/or rear surface 26, assuming one or both even forms a flat surface in the direction illustrated from left to right in FIGS. 3, 4, 5A and 5B, is determined more by performance capabilities and ease of installation than by any fixed geometric relationship. For example, for optimum performance in embodiments such as illustrated in FIGS. 3, 4, 5A and 5B, to optimize the light exiting the light pipe 40' in FIG. 3 (or fiber optic elements 40" in FIGS. 5A and 5B), it may be desirable for the LED 50 and light pipe 40' to be in other than a 90° relationship. In such case, the degree to which this angle may depart from 90° will depend on space available at the rear of the panel 22, optical performance characteristics of, e.g., the LED 50 and light pipe 40' and/or of their angular relationship, and ease of installation or other requirements.

Similarly in regard to the definition of a "parallel" extending relationship as used in the present disclosure, it will be understood that the panel 22 and, therefore, its front surface 24 and rear surface 26 may be curved in the direction in and out of the paper as illustrated in FIGS. 3, 4, 5A and 5B. In such event, the parallel extending portion 92 of the holder 90 (90', 90" in FIGS. 5A and 5B) may also be curved, e.g., cylindrical, so that "parallel" in this regard may mean a generally parallel relationship, but, with distances between respective parallel lines draw on the surfaces of the respective elements, having a changing separation distance.

It also will be understood that the respective surfaces 24, 26 may be topographically irregular in other ways such that defining parallel extending is impossible in regard to such film 24, 26 surfaces. In such event parallel extending may be judged from some plane within the panel 22, again recognizing that the panel also may be curved at least in the region of the parallel extending portion 92 of the LED holder 90 according to aspects of an embodiment of the claimed subject matter, illustrated in FIGS. 3, 4, 5A and 5B.

Figure 4:
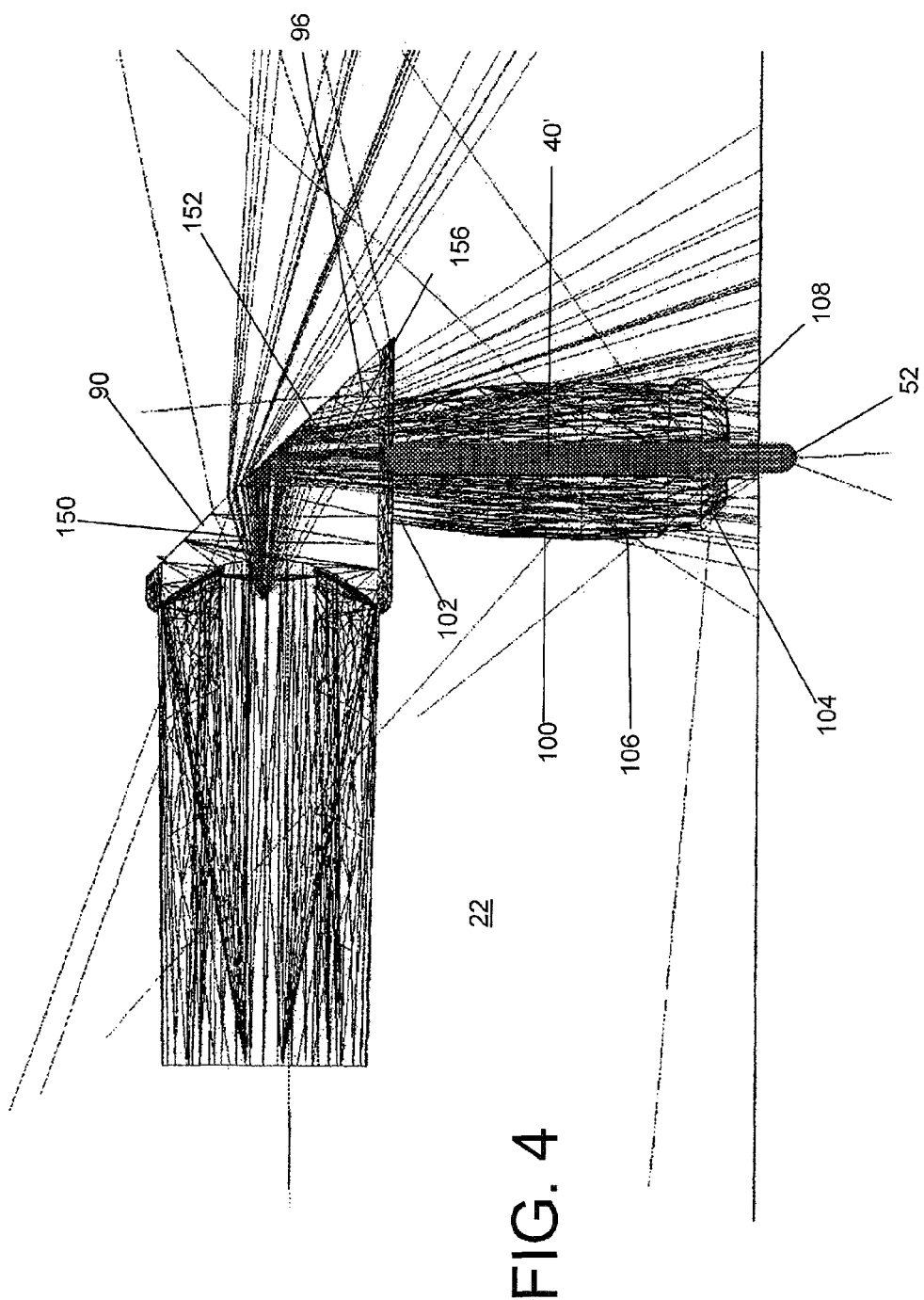
FIG. 4 shows an illustrative light raytrace diagram for the embodiment of FIG. 3.
Figure 5A:
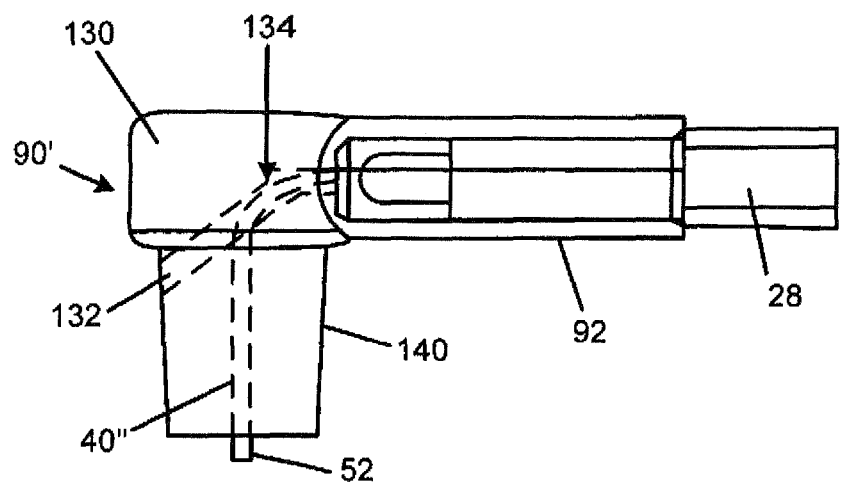
FIGS. 5A and 5B show partly schematically a side view of an alternative embodiment of the present disclosure.
Figure 5B:
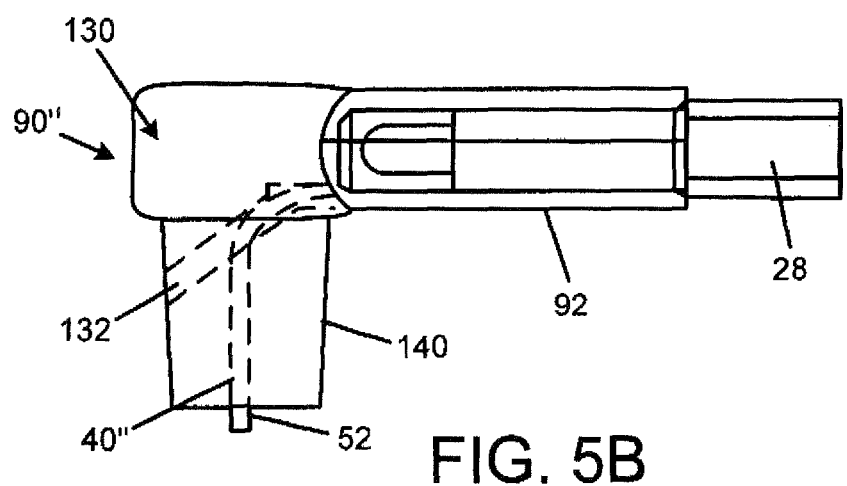
Figure 6:
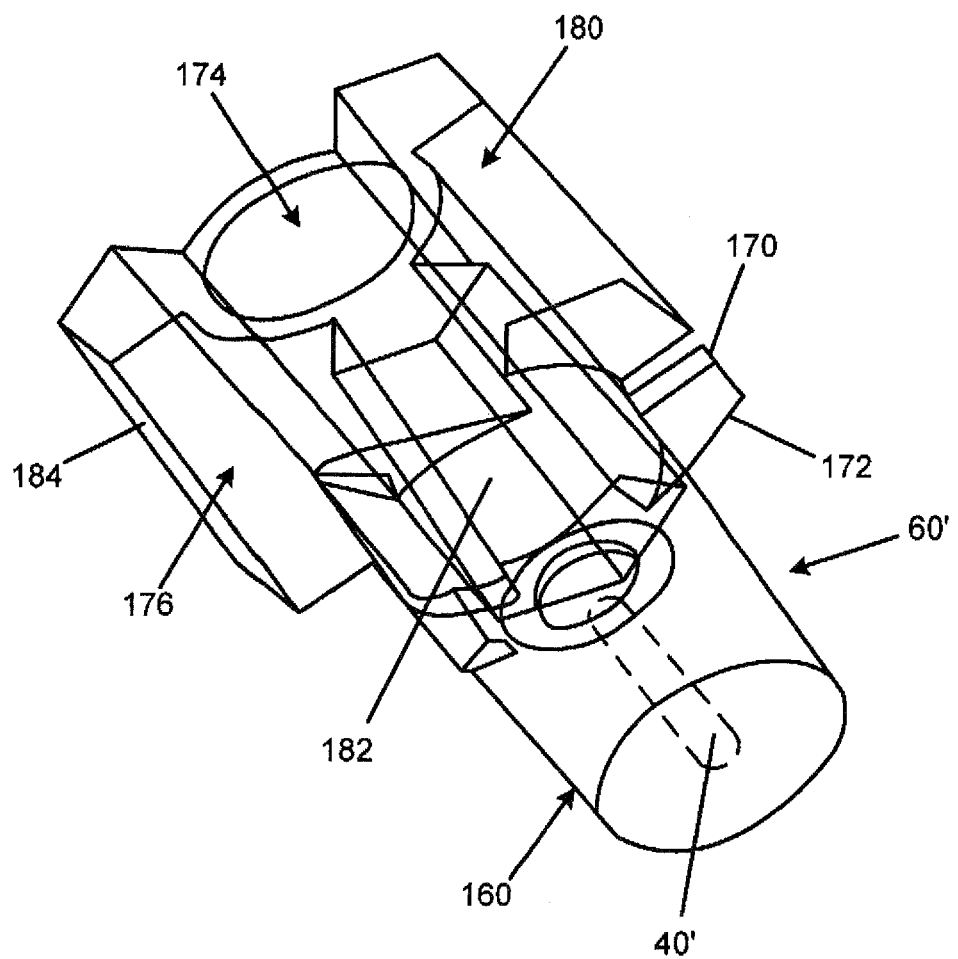
FIG. 6 shows a perspective view of an LED holder according to aspects of yet another embodiment of the present disclosure.

In short, "parallel extending" in the context of the present disclosure means that, as viewed in the illustrations of FIGS. 3, 4, 5A and 5B, the LED receiving portion 92 extends other than vertically as illustrated in FIGS. 2 and 6, to a degree practical with other operating and installation requirements imposed, while saving enough space through being "parallel" or "horizontally" extending as opposed to "vertically" extending (again in relation to the illustrative drawings and not any actual horizontal/vertical coordinate system) so as to decrease the extension of the holder 90, 90', 90" sufficiently to meet available rear space requirements imposed.

The parallel extending portion 92 of the LED holder 90 as illustrated in FIG. 3, also may be formed of a suitable molded plastic, or formed in multiple molded plastic pieces able to be snapped into place with respect to each other. The portion 92 may have a horizontally extending LED 50 receptor opening 94 in the portion 92, e.g., a cylindrical opening 94 to receive the LED 50 and its wiring assembly 51, which may be at the terminal end of an LED string 28. Adjacent the parallel extending holder portion 92 terminus of the hollow opening 94 containing the LED 50 may be an optical light redirecting element 96, which may be in the form of a prism 96, which may be a total internal reflection ("TIR") prism 96. The holder 90 also may include a light pipe alignment and positioning housing 100 extending through the panel 22, in an illustrative embodiment, but not so limited, generally at a right angle to the longitudinal axis of the LED 50 receiving portion 92.

The light pipe alignment and positioning housing 100, as shown more clearly in the illustration of the raytrace diagram for the embodiment of FIG. 3, may have a back end taper region 102 and a front end taper region 104, i.e., it may bulge at its middle region 106. The housing 100 may have a guide protrusion 108 extending outward, e.g., from the front end taper region 104. The housing 100 may be inserted into a locking tub 110, which may be formed of an opaque molded plastic, such as nylon, and have a shallow cylindrical front end 112 with a curved front surface 114, and a plurality of locking arms 120, separated by respective intermediate slots 124, and each with a locking fin 126 positioned along its outer surface.

In operation, the locking tub 110 may be inserted into a holder reception hole in the panel 22, such as a cylindrical hole. The flexibility of the locking arms 120 allows for the locking tub 110 to be fully inserted into the hole in the panel 22 without the fins 126 penetrating the material of the panel 22. Subsequently, the housing 100 may be inserted into the hole in the panel 22, with its tapered portion fitting within the opening formed by the locking tub arms 120 compressed during the prior insertion of the locking tub 110. The bulge in the middle portion 106 of the housing 100 serves to drive the locking fin 126 on each respective locking tub arm 120 into the surrounding material of the hole in the panel 22 locking the locking tub 110 in place within the hole. Thus, the passage of the bulge of the middle portion of the housing 100 past the point where the fins 126 are driven into locking position "snaps" the housing 100 in place vis-a-vis the locking tub 110 and the panel 22. The guide protrusion 108 travels down a selected one of the slots 124 intermediate the tub arms 120 to align the holder 90 to the locking mechanism tub 120.

The terminal end of the locking tub 110 may be formed to have the same beveled light pipe opening 38 with the same bevel 72 as illustrated in FIG. 3. In addition, the light pipe 40' may be inserted through this opening 38 after drilling of a light pipe hole through the front film 24 in the same fashion as explained with respect to FIGS. 2 and 2A. The light pipe 40' is thus similarly aligned and positioned, vis-à-vis, e.g., its protrusion on the decorative surface front side of the film 24. As discussed above a positioning tool also may be used for light pipe 40' positioning vis-à-vis the decorative front surface of the film 24.

As illustrated in FIG. 4, light may be seen to radiate from the LED 50 acting as more or less a point source with a defined cone of radiation 150 incident on the interior surface of the face 152 of the prism 96. Depending on the angle of incidence within the cone of radiation 150 on the internal face 152 of the prism 96, and the color (wavelength) of the light, a portion of the light radiating from the LED 50 will be totally internally reflected in a beam 152 generally aligned with the light pipe 40'. Other angles of incidence result in refracted light exiting the prism 96 and/or other forms of internal reflection within the prism and/or internal reflections which are not aligned to the light pipe 40'. Also, certain coatings may be applied to the external surface of the face 152 of the prism 96 to increase the internal reflectivity; however, the conical shape of the radiation emitted by the LED 50 (as opposed to a collimated beam) will still result in TIR light not entering the light pipe or entering at angles that result in excessive attenuation prior to exit from the terminal end 52 of the light pipe 40'.

FIGS. 5A and 5B illustrate an alternative to the embodiment to FIGS. 3 and 4. In such an embodiment, in lieu of the prism element 96, the holder 90' includes a fiber optic element 40" interacting with the LED 50 contained in a parallel extending holder portion 130 to deliver the light to the light pipe terminal end exit point 52. For ease of manufacture, the path for the fiber optic cable 40" is formed by molding holes in plastic elements, such as a horizontally extending (defined as such as corresponding to the illustration viewed in the FIG. 5A and not limited to conforming to any real horizontal axis in use) hole 134 and slanted hole 132 in FIG. 5A, or a single slanted hole 132 in FIG. 5B. All holes are made in the mold by side action.

The vertically (again not limited to any real horizontal/vertical axis coordinate system when actually in use) extending portion 140 of the embodiments of FIGS. 5A and 5B may be formed with a taper and with external treads to lock in a holder receptor hole in the panel 22. Further the threaded arrangement may be self-locking and self threading to permit control of the positioning and alignment of the portion 140 within the hole in the panel and also fixing the holder 90', 90" in position with the terminal end 52 of the light pipe properly positioned and aligned. This may advantageously be done by using a standard so-called National Pipe Thread ("NPT") threading arrangement.

Figure 2A:
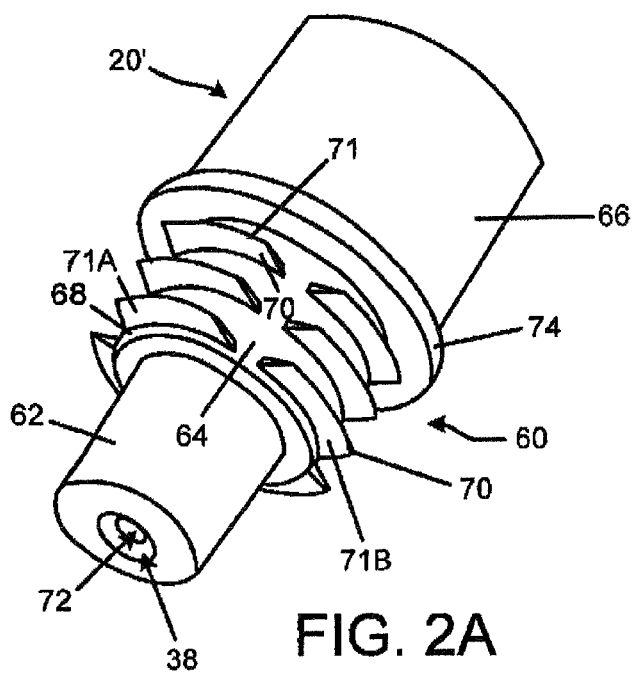
FIG. 2A shows a perspective view of the LED holder of FIG. 2.

It may be advantageous, especially regarding the embodiments of FIGS. 2A, 5A and 5B, to fabricate elements of the LED holder 60, 90', 90" in a plurality of parts. This is particularly so for threaded engagement arrangements 140, such as illustrated as examples in FIGS. 5A and 5B. There, screwing in of the threaded elements 140 into the LED receptor holes in the panel 22 may be inconvenient with the LED 50 and its associated string end 28 and/or wiring housing 51 in place. Alternately, of course, the LED 50 and/or the string end 28 may be inserted into the holder 90, 90', 90" after insertion of the threaded portions 140 of the holder 90, 90', 90" into the panel 22. In this event, as to a threaded engagement version as illustrated in FIGS. 5A and 5B, the parallel extending portions into which the LED 50 may ultimately be inserted, may be used as wrench arms to facilitate insertion of the threaded vertically extending threaded portions 140 into the threaded holder reception holes in the panel 22.

It will also be understood by those skilled in the art, that the panel 22 insertion alignment, positioning and locking aspects of the embodiment of FIGS. 2 and 2A could be applied with the embodiments of FIGS. 3 and 4 or the embodiments of FIGS. 5A and 5B. That is, the vertically extending insertion positioning and locking member portions 62, 64 of the embodiment of FIGS. 2 and 2A, with the external cylindrical portion 66 removed, could be utilized in the embodiments of FIGS. 3 and 4 or the embodiments of FIGS. 5A and 5B. In such a case, the prism 96 extension of the horizontal portion 92 of the parallel extending holder 90 could be positioned in place of the external cylindrical portion 66 of FIGS. 2 and 2A or the horizontally extending portion 130 of the embodiments of FIGS. 5A and 5B could also replace the external cylindrical portion 66 in the embodiments of FIGS. 2 and 2A. This could also be accomplished by forming the LED holder 90, 90', 90", respectively of FIGS. 4, 5A and 5B in multiple pieces, such as a vertically extending portion and parallel extending portion which may be snap fitted together prior to or during installation.

For such multiple piece construction, the snap locking technology of U.S. Pat. No. 5,772,380 to Cloud et al. incorporated herein by reference, may be utilized.

Turning now to FIG. 6 there is illustrated an alternate embodiment in which an LED holder 60' of FIG. 2 includes a front positioning and locking portion 160 similar to that described with respect to the embodiments of FIGS. 5A and 5B, excepting for the addition of a ramped locking fin 170 having a leading knife edge 172, that can engage the panel material upon insertion of the LED holder 60' into an LED holder receptor hole in the panel and rotation of the portion 160. The ramped fin 170 with the leading knife edge penetrating the material of the panel and spiraling frontward will lock the front portion 160 of the holder 60' in the panel after the desired penetration through rotation of the holder 60'. In this regard, the exterior of the insertion alignment, positioning and locking portion 160, unlike that of the embodiments of FIGS. 5A and 5B can be without external threads and the hole in the panel without internal threads, relying only on the fin 170, or perhaps a plurality of such fins 170, to lock the portion 160 in position in the receptor hole in the panel.

The external portion 180 is formed to have a hollow opening, such as a cylindrical opening 174 to receive the LED 50 and wiring assembly (not shown in FIG. 6) with a plurality of protrusions 176 each having hex nut receptor faces 182, 184 for ease of installation utilizing a hex nut wrench and with intermediate openings 180 to save material and thus also weight. The light pipe 40' is shown in phantom and the installation, alignment, positioning and locking in place of the same is as described with respect to the embodiment of FIGS. 2, 3 and 4.

Various changes may be made in the above disclosure. For example, the positioning and holding mechanism may comprise a hollow insertion portion extending into the insertion hole, such as the cylindrical portions 62 and 64 of FIG. 2, the light pipe housing 100 of FIG. 3 or the threaded portions 140 and 160 of respectively FIGS. 5A and B and FIG. 6. The hollow insertion portion may receive an LED assembly. The holder may include a locking mechanism such as the fins 70 of FIG. 2, or the expandable tub 110 of FIG. 3, or the threads of FIGS. 5A and 5B and FIG. 6, or the inclined fin 170 or FIG. 6, or combinations of these, locking the insertion portion in place after insertion into the insertion hole. A light pipe reception and holding mechanism may also have a light pipe inserted into the light pipe reception and holding mechanism.

The light pipe reception and holding mechanism may comprise a beveled opening such the opening 38 with bevel 72 as shown in FIGS. 2 and 2A and described as a part of the other illustrative embodiments, aligned with a light pipe opening in the film. The positioning and holding mechanism of may comprise an insertion stopping flange such as flange 74 shown in FIG. 2, the portion of the prism 96 abutting the rear film 26 as shown in FIG. 3 or the portions of the protrusions 176 of FIG. 6 that abut the rear film 26 in FIG. 6.

The flexible fins 70 shown in FIG. 2 may flex in a direction opposite to the direction of insertion of the position and holding mechanism into the insertion hole, i.e., toward the top of the paper in the illustration of FIG. 2. The tub such as tub 110 in FIG. 3 may comprise a locking arm 120, one of a plurality shown in FIG. 3, with a locking fin 126 driven into the material of the panel upon insertion of the insertion portion, such as the light pipe housing 100 of FIG. 3, into the expanding tub 100 positioned in the insertion hole. The locking mechanism may comprise an NPT threaded engagement of the insertion mechanism with the insertion hole. The locking mechanism may comprise an inclined fin (such as a fin that is ramped from a knife edge with the ramp forming an inclined fin face) entering the material of the panel upon rotation of the insertion mechanism.

The panel illumination light source positioning and holding mechanism may further comprise a hollow insertion portion extending into the insertion opening, the hollow insertion portion receiving a light pipe, a locking mechanism locking the insertion portion in place after inserting into the insertion hole, and a parallel extending LED receiving portion such as 92 in FIG. 3 reflecting light into the light pipe, e.g., with the prism 96 of FIG. 3 or otherwise directing light to an exit point, such as the terminal end of a fiber optic element 40" in FIGS. 5A and 5B.

We claim:

1. An apparatus, comprising:
    a hollow front end tube dimensioned to extend into an insertion hole in a panel, the panel having a front film forming an illumination surface on a front side and the panel having a rear film on a back side, the hollow front end tube comprising a light pipe opening having a beveled countersunk edge;
    a first back end tube coupled to the hollow front end tube and dimensioned to extend into the insertion hole, the first back end tube comprising a locking mechanism to lock the first back end tube in place by physical interference with a material in an interior region of the panel after insertion of the first back end tube into the insertion hole;
    a second back end tube coupled to the first back end tube and having an aperture dimensioned to receive a light source, wherein the second back end tube includes a plurality of protrusions each having a hex nut receptor face, and wherein the hex nut receptor faces are separated by intermediate openings between protrusions of the plurality of protrusions; and
    a positioning flange disposed between the first back end tube and the second back end tube, wherein the positioning flange engages with the rear film to limit insertion of the hollow front end tube.

2. The apparatus of claim 1, wherein the hollow front end tube comprises colored plastic.

3. The apparatus of claim 1, wherein the locking mechanism comprises a plurality of flexible fins adapted to flex in a direction opposite to a direction of insertion of the first back end tube into the insertion hole, and wherein the flexible fins are configured to penetrate the panel in response to an attempt to remove the hollow front end tube from the panel.

4. The apparatus of claim 1, wherein the hollow front end tube, the first back end tube, the second back end tube, and the positioning flange are a single piece of molded plastic.

5. The apparatus of claim 1, wherein the locking mechanism comprises at least one of a national pipe thread for threaded engagement of an insertion mechanism with the insertion hole or an inclined fin to enter the material of the panel upon rotation of the insertion mechanism.

6. The apparatus of claim 4, further comprising a light pipe configured to couple to the light pipe opening, wherein the light pipe has a diameter which selectively positions the light pipe in a proper position relative to the front film and the light source.

7. The apparatus of claim 1, wherein insertion of a light pipe into the light pipe opening forces debris proximate the light pipe opening into a cavity formed by the beveled countersunk edge.

8. An apparatus, comprising:
    a light pipe alignment and positioning housing which extends into an insertion hole in a panel, the panel having a front film forming an illumination surface on a front side and the panel having a rear film on a back side;
    a locking mechanism to lock the light pipe alignment and positioning housing in place in the insertion hole by physical interference with a material of the panel;
    an insertion stopping flange formed on the light pipe alignment and positioning housing, wherein the insertion stopping flange engages with the rear film to limit insertion of the light pipe alignment and positioning housing;
    a plurality of protrusions formed on the light pipe alignment and positioning housing, each protrusion of the plurality of protrusions having a hex nut receptor face, wherein the hex nut receptor faces are separated by intermediate openings between protrusions of the plurality of protrusions;
    a light emitting diode (LED) holder to hold an LED in an orientation that is approximately parallel to the illumination surface, wherein the LED holder and the light pipe alignment and positioning housing are integrally formed from a single piece of material; and
    an optical light redirecting element positioned within the LED holder to redirect light from the LED into the light pipe alignment and positioning housing.

9. The apparatus of claim 8, wherein the insertion hole comprises a beveled opening aligned with a light pipe opening in the front film.

10. The apparatus of claim 8, wherein the LED holder is configured to be used as a wrench arm to facilitate insertion of the light pipe alignment and positioning housing.

11. The apparatus of claim 8, wherein the locking mechanism comprises a plurality of flexible fins, wherein the plurality of flexible fins are tapered to a knife edge and shaped with a generally flat upper surface and a slight curved lower surface such that the plurality of fins bend toward the insertion stopping flange when the light pipe alignment and positioning housing is inserted into the insertion hole in the panel and penetrate panel material surrounding the insertion hole when the light pipe alignment and positioning housing is urged out of the insertion hole.

12. The apparatus of claim 8, wherein the locking mechanism comprises a flexibly expanding tube comprising a locking arm with a locking fin for driving into panel material upon insertion of the light pipe alignment and positioning housing into the flexibly expanding tube positioned within the insertion hole.

13. The apparatus of claim 8, wherein the locking mechanism comprises a national pipe thread (NPT) for threaded engagement of an insertion mechanism with the insertion hole.

14. The apparatus of claim 8, wherein the locking mechanism comprises an inclined fin for entering panel material upon rotation of an insertion mechanism.

15. The apparatus of claim 3, wherein the plurality of flexible fins are tapered to a knife edge and shaped with a generally flat upper surface and a slight curved lower surface such that the plurality of fins bend toward the second back end tube when first back end tube is inserted into the insertion hole in the panel and penetrate the material of the panel surrounding the insertion hole when the first back end tube is urged out of the insertion hole.

16. The apparatus of claim 8, wherein the light pipe alignment and positioning housing, the locking mechanism, the insertion stopping flange, and the LED holder are formed of a single piece of molded plastic.

17. The apparatus of claim 8, wherein the optical light redirecting element comprises a prism positioned to redirect the light by total internal reflection.

18. The apparatus of claim 8, wherein the optical light redirecting element is a light pipe, wherein the light pipe alignment and positioning housing forms a molded hole, and wherein the molded hole bends the light pipe to approximately 90 degrees.

19. The apparatus of claim 8, wherein the light pipe alignment and positioning housing and the LED holder are snap fit together.

20. A method comprising:
inserting a light source holder into an insertion hole in a panel, the panel having a front film forming an illumination surface on a front side and the panel having a rear film on a back side, the light source holder comprising:
a hollow front end tube dimensioned to extend into the insertion hole, the hollow front end tube comprising a light pipe opening having a beveled countersunk edge,
a first back end tube coupled to the hollow front end tube and dimensioned to extend into the insertion hole, the first back end tube comprising a locking mechanism to lock the first back end tube in place by physical interference with a material in an interior region of the panel after insertion of the first back end tube into the insertion hole,
a second back end tube coupled to the first back end tube and having an aperture dimensioned to receive a light source, wherein the second back end tube includes a plurality of protrusions each having a hex nut receptor face, and wherein the hex nut receptor faces are separated by intermediate openings between protrusions of the plurality of protrusions, and
a positioning flange disposed between the first back end tube and the second back end tube, wherein the positioning flange engages with the rear film to limit insertion of the hollow front end tube; and
inserting the light source into the second back end tube.

* * * * *